United States Patent
Kontos et al.

[11] Patent Number: 5,870,901
[45] Date of Patent: Feb. 16, 1999

[54] AIR CONDITIONER REACTOR

[75] Inventors: James S. Kontos, 318 Flora Ave., Glenview, Ill. 60025; Hsiang-Jen Yen, Lisle, Ill.

[73] Assignee: James S. Kontos, Glenview, Ill.

[21] Appl. No.: 966,342

[22] Filed: Nov. 7, 1997

Related U.S. Application Data

[63] Continuation-in-part of Ser. No. 683,232, Jul. 18, 1996.
[51] Int. Cl.$^6$ .................................................. F25B 27/00
[52] U.S. Cl. .................................... 62/238.3; 62/323.2
[58] Field of Search ........................ 62/323.1, 323.2, 62/238.1, 238.4, 243, 239, 238.3

[56] References Cited

U.S. PATENT DOCUMENTS

| | | | |
|---|---|---|---|
| 2,181,851 | 11/1939 | Schlumbohm | 62/323.1 |
| 2,436,281 | 2/1948 | Bartlett et al. | 62/323.1 |
| 3,070,975 | 1/1963 | Cornelius | 62/323.1 |
| 3,922,877 | 12/1975 | Ophir et al. | 62/238.1 |
| 4,309,877 | 1/1982 | Tawse | 62/238.1 |
| 4,341,088 | 7/1982 | Mei et al. | 62/239 |
| 4,918,937 | 4/1990 | Fineblum | 62/175 |
| 5,205,133 | 4/1993 | Lackstrom | 62/238.4 |

FOREIGN PATENT DOCUMENTS

| | | | |
|---|---|---|---|
| 59-118521 | 7/1984 | Japan | 62/323.1 |
| 405215435 | 8/1993 | Japan | 62/323.2 |

*Primary Examiner*—William Doerrler
*Attorney, Agent, or Firm*—Lee, Mann, Smith, McWilliams, Sweeney & Olhson

[57] ABSTRACT

An air conditioning reactor is provided for producing high temperature, high pressure refrigerant in an engine driven air conditioning system. The system derives power from the waste heat from the coolant of an exothermic engine. The reactor has a double chamber construction which includes an inner chamber and outer chamber. Low temperature refrigerant vapor flows into the inner chamber while high temperature coolant flows into the outer chamber and around the exterior of the inner chamber, thereby raising the temperature and pressure of the refrigerant inside the inner chamber, and causing release of high pressure, high temperature refrigerant out of the inner chamber of the reactor. The reactor can therefore eliminate the need for a compressor in an air conditioning system by utilizing the waste heat in the coolant flowing out of a thermal combustion engine to produce high pressure, high temperature vapor. The reactor can also operate having a reactor chamber internal an engine or engine housing wherein the pressure and temperature of the refrigerant in the reactor chamber is raised by the transfer of energy from the high temperature engine.

10 Claims, 5 Drawing Sheets

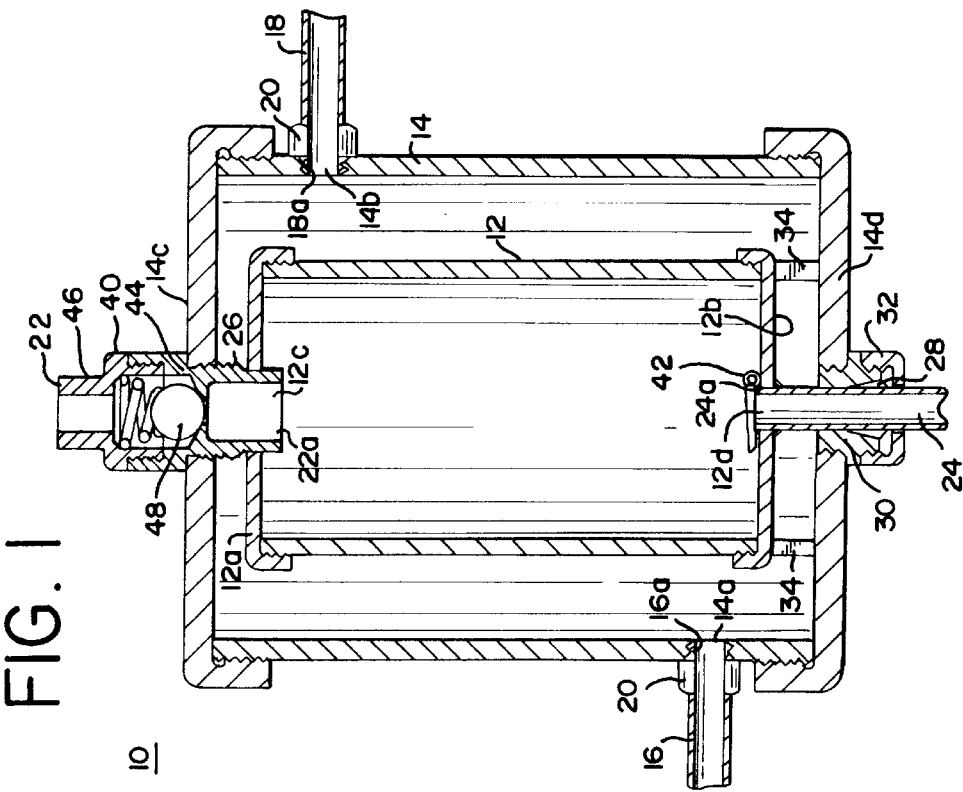

AIR CONDITIONER REACTOR

CONTINUING APPLICATION

This application is a Continuation-In-Part claiming priority based on Applicant's parent application Ser. No. 08,683,232 filed Jul. 18, 1996.

BACKGROUND OF THE INVENTION

This invention in general, relates to the field of air conditioning systems. It particularly relates to air conditioning systems which derive energy from the waste heat of an engine.

Conventional air conditioning units such as the ones used in automobiles usually include a compressor for compressing the refrigerant gas before the gas is condensed in a condenser. The compressor is usually belt driven by an engine crankshaft. The typical inclusion of a compressor in an automobile air conditioning system requires a certain amount of horsepower from the automobile engine for the air conditioning system to operate. Since an engine only delivers up to a certain amount of horsepower, the more energy needed by the compressor to power the air conditioning unit, the less energy there will be remaining to power the automobile. Also, more fuel will be needed to run the automobile when the compressor is operating. The power required to drive the compressor places a substantial strain on the automobile engine thus reducing the performance and thereby reducing engine efficiency by burning more fuel for less miles per gallon of fuel. In smaller automobiles, the amount of power strain is so high that the automobile speed of the vehicle is reduced. Larger automobiles that have more available horsepower do have sufficient power to operate the air conditioning without excess drain on the engine, however, excess fuel is still wasted.

Prior art exists which eliminates the need for a compressor in an air conditioning system. Presently, there exists prior art which utilizes the waste heat of an engine passed out through the engine exhaust system, in combination with a liquid pump to power an air conditioner without the need of a compressor. This closed system includes a generator through which refrigerant gas passes. The generator is connected to the automobile engine exhaust system for heating the refrigerant gas as it passes through the generator by the waste heat from the engine, thus raising the temperature and pressure of the refrigerant and evaporating the refrigerant before it is condensed in the condenser.

There also exists a double vortex chamber flow inducer and generator combination used to accomplish thermal compression in a thermally powered compression circuit, in which the power for the circuit is derived from the waste heat of the coolant in the internal combustion engine. However, this double vortex/generator construction must be used in conjunction with mechanically power to function effectively as an air conditioning unit.

SUMMARY OF THE INVENTION

It is one object of this invention to completely eliminate the need of a compressor in an air conditioning system. It is another object of this invention to increase the horsepower available to run an automobile. It is another object to utilize the heat generated in the coolant of an exothermic engine, whether an internal combustion engine or another engine or motor that gives off waste heat. It is yet another object of the invention to save fuel and/or conserve energy in running an engine.

The invention is an air conditioning system for all kinds of motor vehicles in which wasted energy from the engine is utilized for powering the air conditioning system, whereby no additional power is taken from the vehicle engine to run the system. The invention provides an air conditioning system for motor vehicles, comprising a closed refrigerant fluid circuit including a condenser in which the refrigerant is liquified, an evaporator in which the refrigerant vaporizes to provide cooling in the passenger compartment of a motor vehicle due to the change of state from liquid to gas. An evaporator coil is an element included in the system which cools and dehumidifies the air before the air enters the passenger compartment. High pressure liquid refrigerant flows through the expansion tube into a low pressure area of the evaporator. The heat from the air passing through the evaporator core is lost to the cooler surface of the core, thereby cooling the air. As the process of heat loss from the air to the evaporator's core surface takes place, any moisture in the air condenses on the outside surface of the evaporator core and drains off as water.

The integral part of this invention includes a reactor through which the refrigerant gas passes. High temperature water from the engine block flows through the reactor and heats the refrigerant gas as the water passes through the reactor, thereby raising the temperature and pressure of the refrigerant and evaporating the same before the water cools in the heat exchanger and returns as a coolant to cool the engine.

The present invention eliminates the need to use a mechanically driven compressor or a double vortex chamber and generator combination in an air conditioning system. The present invention performs the function of an automobile air conditioner compressor without having to be belt driven by an engine crankshaft. The invention can be of a double chamber structure and include an inner chamber through which refrigerant vapor flows and an outer chamber through which high temperature coolant flows. The outer chamber has an inlet pipe on one side near one end and an outlet pipe on the other side near the other end. The inner chamber has an inlet pipe extending through the outer chamber connecting to the inner chamber and also has an outlet pipe extending from the inner chamber and out of the outer chamber. The two inner chamber pipes facilitate the flow of refrigerant gas incoming from the evaporator and outgoing to the condenser.

In operation, low pressure, low temperature refrigerant vapor enters the inner chamber through the inner chamber's inlet pipe, and at the same time, high temperature coolant flows into the outer chamber and around the outer walls of the inner chamber through the outer chamber's inlet pipe from the engine. The heat from the high temperature coolant flows into the reactor's cavity between the inner and outer chamber walls, and surrounds the inner chamber's outer walls to raise the low temperature refrigerant entering the inner-chamber to a higher temperature refrigerant vapor. In transforming into a high temperature vapor, the pressure of the refrigerant rises in the inner chamber. The refrigerant is then released through the inner chambers outlet as a high temperature, high pressure refrigerant to the heat (exchanger) condenser. The heat exchanger or condenser liquifies the refrigerant and recirculates the refrigerant. This embodiment eliminates the need for an air-conditioning compressor, thereby, saving horsepower needed to power the compressor. The air conditioner reactor harnesses the heat energy generated by the internal combustion of a gasoline or diesel engine, thereby saving fuel.

This invention can also exist as a structure integral with a vehicle engine whereas, an engine block is provided having an additional engine chamber for refrigerant. Low temperature refrigerant enters the additional chamber provided for in the engine block from the condenser. Once in the engine chamber, waste heat from the running engine raises the temperature of the refrigerant to where the refrigerant inside the engine block becomes a high temperature, high pressure vapor and exits the integral engine chamber flowing to a condenser and then liquifies to a high pressure hot liquid. The high pressure liquid refrigerant flows through and out of the condenser to an evaporator. While flowing through the evaporator, the liquid refrigerant vaporizes as it picks up heat from the air. The refrigerant then exits the evaporator as a low pressure cool vapor and circulates to and re-enters the integral engine chamber to start the cycle over again. In this second embodiment, the use of an integral reactor chamber is not limited to an internal combustion engine, but may be used in conjunction with any engine which generates a sufficient level of heat to raise the temperature and pressure of the refrigerant such as an electric engine.

DESCRIPTION OF THE DRAWINGS

FIG. 1 is a sectional view of the structure and connecting pipes of the reactor;

FIG. 2 is a perspective view of the air conditioner reactor with a partial section of the outer chamber cut out to show a partial perspective view of the inner chamber.

DESCRIPTION OF THE PREFERRED EMBODIMENT

Figure 3:
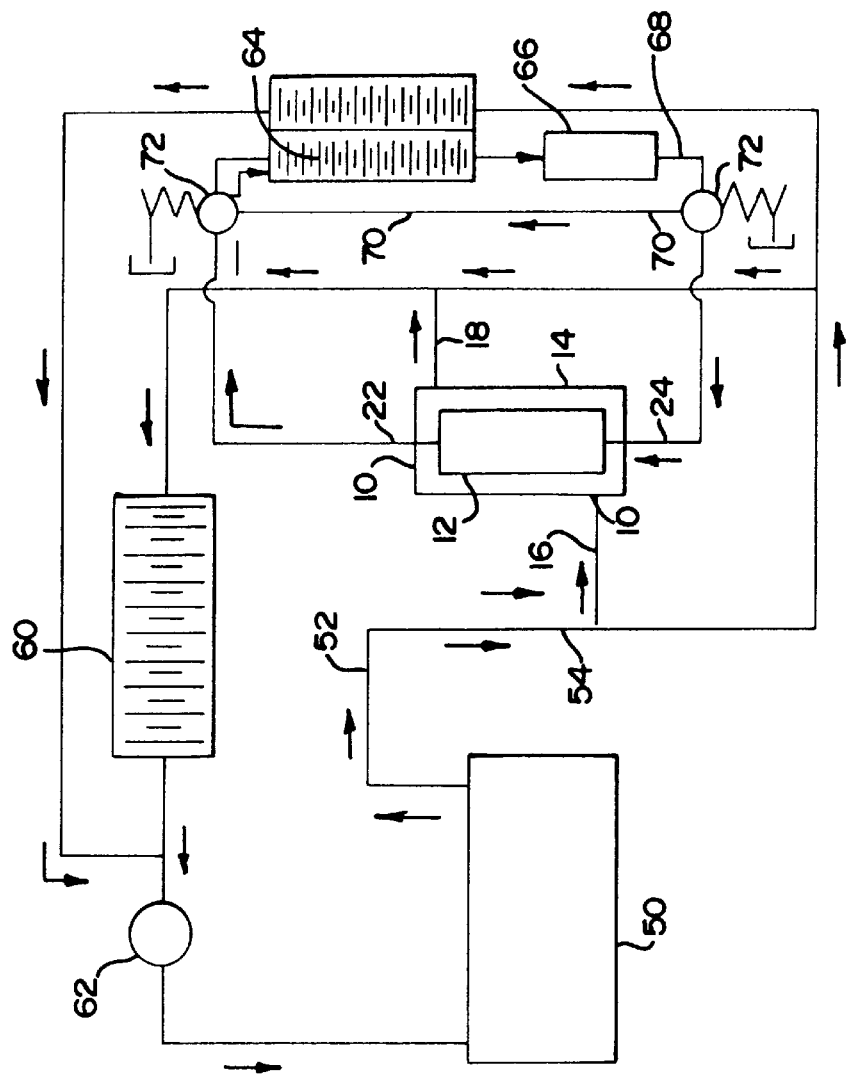
FIG. 3 is a schematic of an air conditioning system having an air conditioner reactor.

FIG. 1 illustrates the air conditioner reactor 10 having an inner chamber 12 and an outer chamber 14. As seen in FIG. 2, the outer chamber has an inlet pipe 16 and an outlet pipe 18. In the preferred embodiment, both the inlet and outlet pipes 16 and 18, have threaded ends 16a and 18a for screwing into threaded holes 14a and 14b of the outer chamber. Pipe nuts 20 are used to securely attach pipes 16 and 18 to the outer chamber. The outer chamber 14 also has first and second ends 14c and 14d screwably attached to the outer chamber 14. First end 14c has a threaded hole 26 therethrough for accommodating an inner chamber outlet pipe 22, and second end 14d has a threaded hole 28 therethrough for accommodating an inner chamber inlet pipe 24. Screwed within each hole 26 and 28 is a threaded insert piece 30 for creating a snug fit between hole 26 and outlet pipe 22, and between hole 28 and inlet pipe 24.

It will be understood that while screw threaded fittings are preferred for ease of fabrication and their ready availability, other means for joining pipe-like fittings will be found equivalent by one of ordinary skill, including, but not limited to, soldering, welding, clamping or tubing junctions with compression fit, as well as forming certain of the parts in one piece as by casting, forging or machining. Further, the elements described for the chamber may be formed as an integral part of the housing for a motor to use waste heat of either an internal combustion engine or an electrical motor, either may sometimes be referred to herein as an "engine."

The inner chamber 12 has a first end 12a and a second end 12b. First end 12a has an outlet hole 12c therethrough, and second end 12b has an inlet hole has an inlet hole 12d therethrough. Outlet pipe 22 has a chamber end 22a attached to outlet hole 12c. Inlet pipe 24 has a chamber end 24a attached to inlet hole 12d. Supports 34 are provided to attach the inner chamber 12 to outer chamber 14.

FIG. 3 illustrates the process flow of the air conditioning system utilizing the air conditioning reactor 10: hot coolant from an engine or motor 50 flows via duct 52 to junction 54. At junction 54 the coolant passes through duct and inlet pipe 16. The hot coolant passing through inlet pipe 16 flows into the outer chamber 14 and around the inner chamber 12 of the reactor 10 (As seen in FIG. 2). The hot coolant exits the outer chamber 14 from outlet pipe 18 and flows to a radiator 60. On a water cooled internal combustion engine, as illustrated in this embodiment, a water pump 62 pumps and recirculates the now cooler coolant from the radiator 60 back to the engine block 50.

Simultaneously, during the circulation of coolant through the coolant system, low pressure refrigerant enters the inner chamber 12 through inlet pipe 24. The high temperature coolant flowing around the outside of inner chamber walls 12 and inside the outer chamber walls 14 raises the temperature and pressure of the refrigerant inside the inner chamber 12. In inner chamber 12 the refrigerant becomes a high temperature, high pressure vapor and exits the inner chamber 12 through outlet pipe 22 as a high temperature, high pressure refrigerant vapor.

Figure 9:
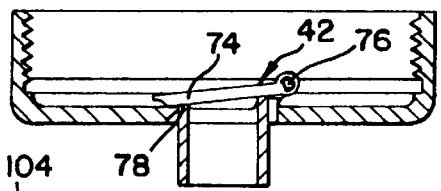
FIG. 9 is a sectional view of another one-way flow control valve.

This flow is preferably accomplished through the action of a valve arrangement. While in appropriate circumstances a convection-like effect may accomplish the flow, greater reliability may be obtained by using a check valve 40 and flap valve 42 at the outlet 22 and inlet 24 positions entering chamber 12. It will be seen with reference to FIGS. 1, 2, and 9 that a valve seat assembly 44 can be threaded into chamber end 14c with top shell 46 in turn threaded into seat 44. This provides a one way path for discharge from chamber to outlet 22 as check ball 48 is displaced against spring 49. Spring 49 can be calibrated to the desired of pressure, depending on the flow characteristics of the system.

Flapper valve 42 has leaf 74 hinged at pivot 76. In its simplest embodiment, when used in conjunction with valve 40, and where aligned vertically gravity can sufficiently force leaf 74 against seat 78. In other embodiments where either geometry or the forces involve require, a spring acting on leaf 74 could provide the needed force. These valves 40, 42 ensure proper flow direction.

This high temperature, high pressure refrigerant vapor then flows to a condenser 64. The condenser 64 liquefies the refrigerant vapor to a high pressure hot liquid. The high pressure liquid refrigerant flows through and out of the condenser 64 to an evaporator 66. While flowing through the evaporator 66, the liquid refrigerant vaporizes as it picks up heat from the air. The refrigerant exits the evaporator 66 as a low pressure cool vapor through duct 68, then through an accumulator 69 and flows back into the inner chamber 12 of the reactor 10 through inlet pipe 24. At this point, the cycle starts over again.

Figure 4:
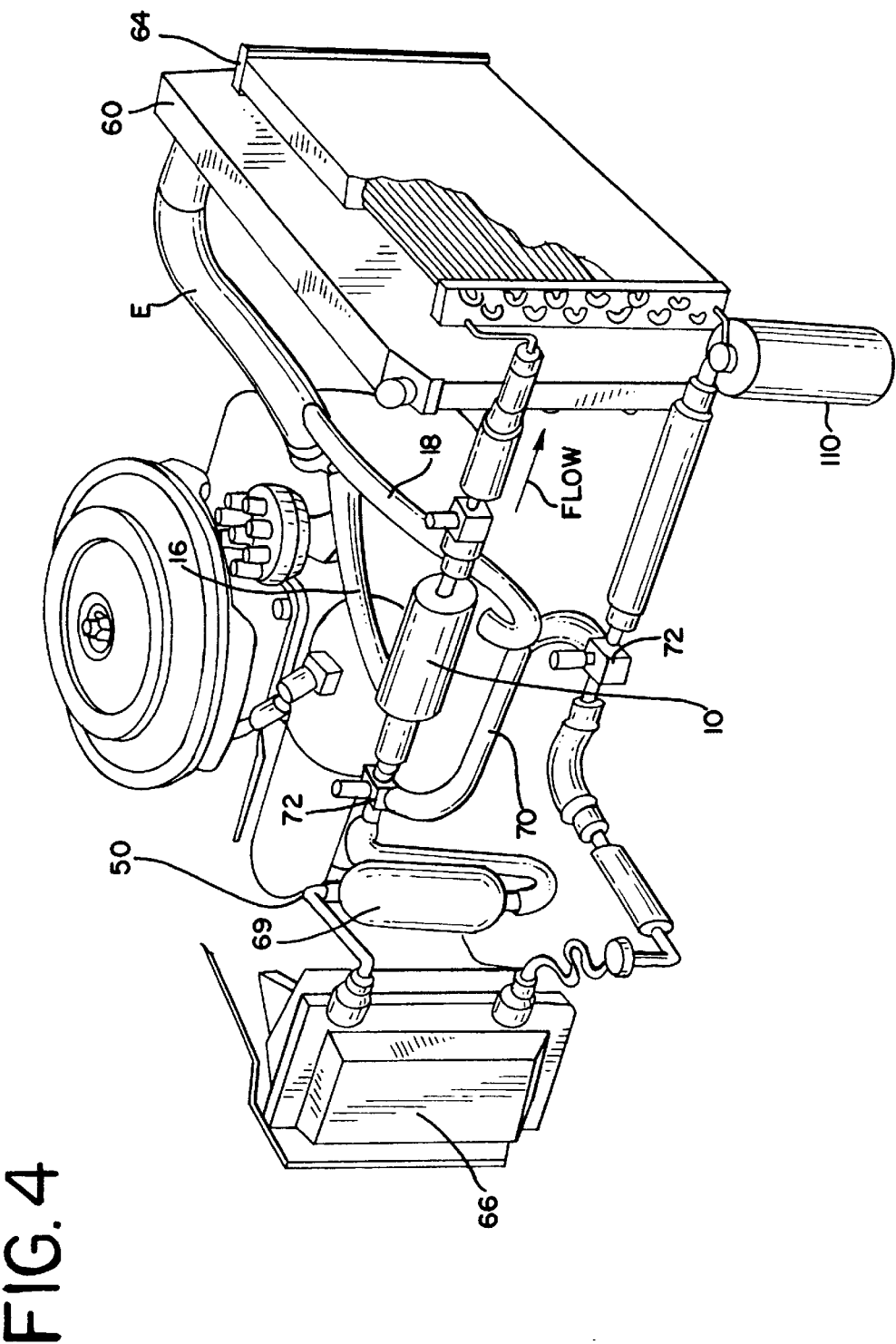
FIG. 4 is a perspective view of an internal combustion engine having an air conditioner reactor integral to the air conditioning system.

A bypass line 70 can be included in the system when cooling is not required. The bypass line 70 is connected between outlet pipe 22 and duct 68. At each junction, where the bypass line 70 connects to outlet pipe 22 and duct 68, is a dual two way flow control solenoid valve 72 for redirecting the flow of the refrigerant and bypassing the reactor 10 in the system when cooling is not required. FIG. 4 is a perspective view of the elements in the system described in FIG. 3.

Figure 5:
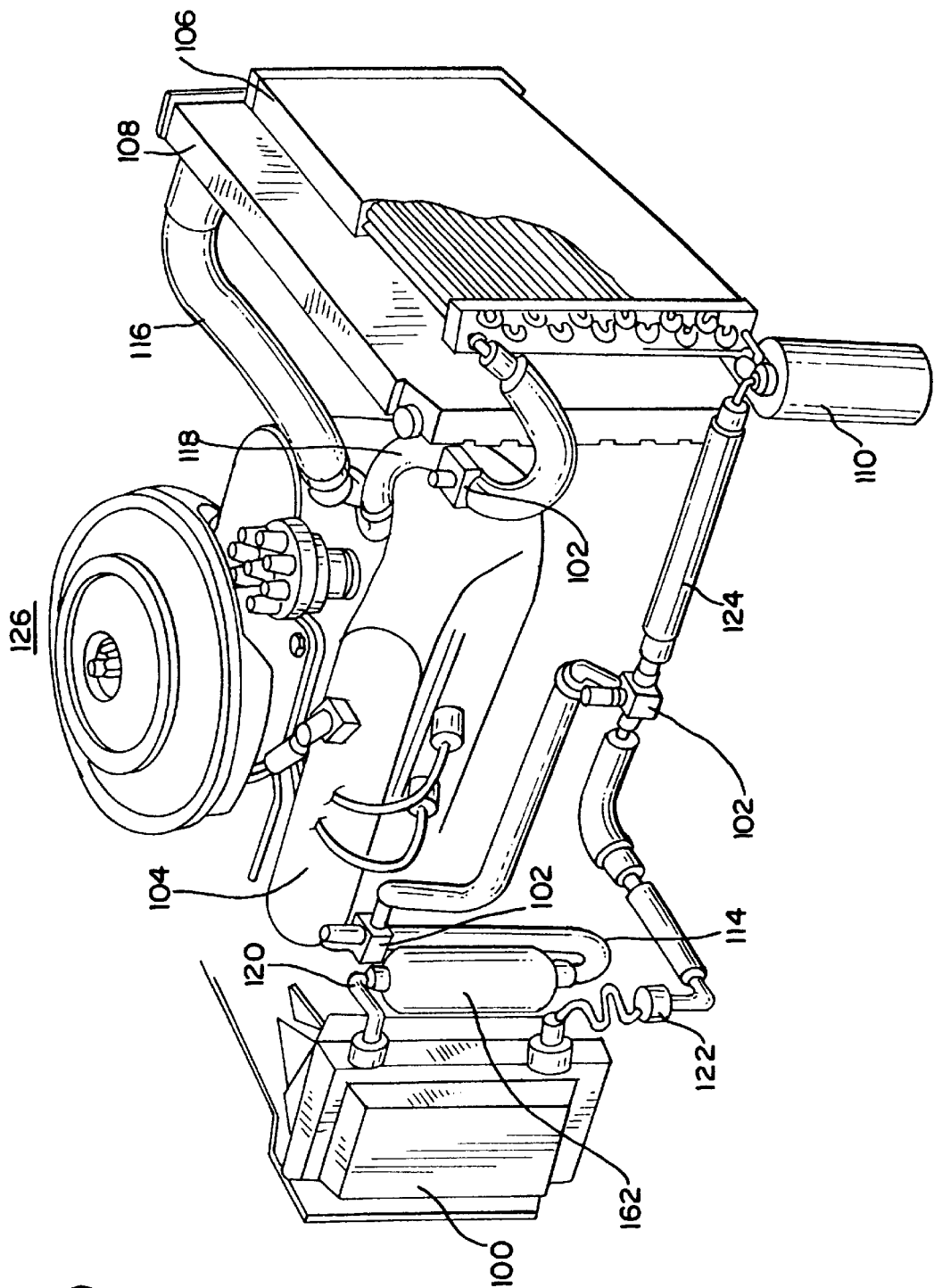
FIG. 5 is a perspective view of an internal combustion engine showing the integral refrigerant engine chamber.
Figure 6:
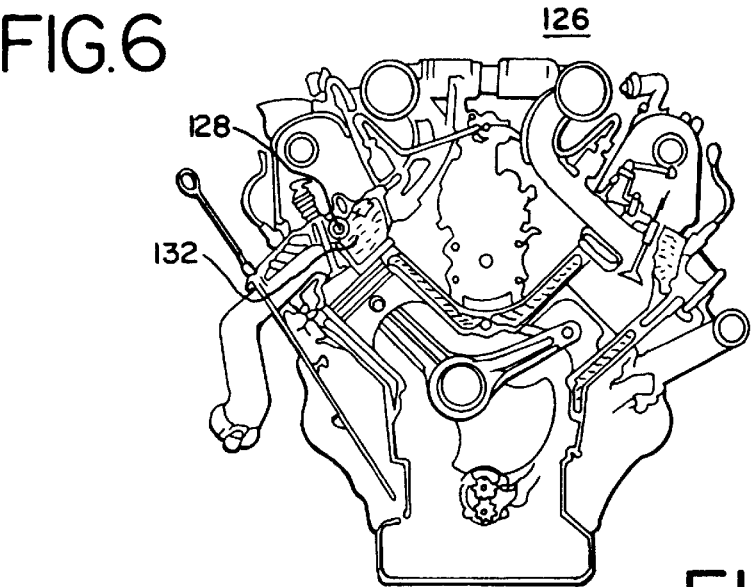
FIG. 6 is a sectional view of an internal combustion engine having a reactor chamber integral therein.
Figure 7:
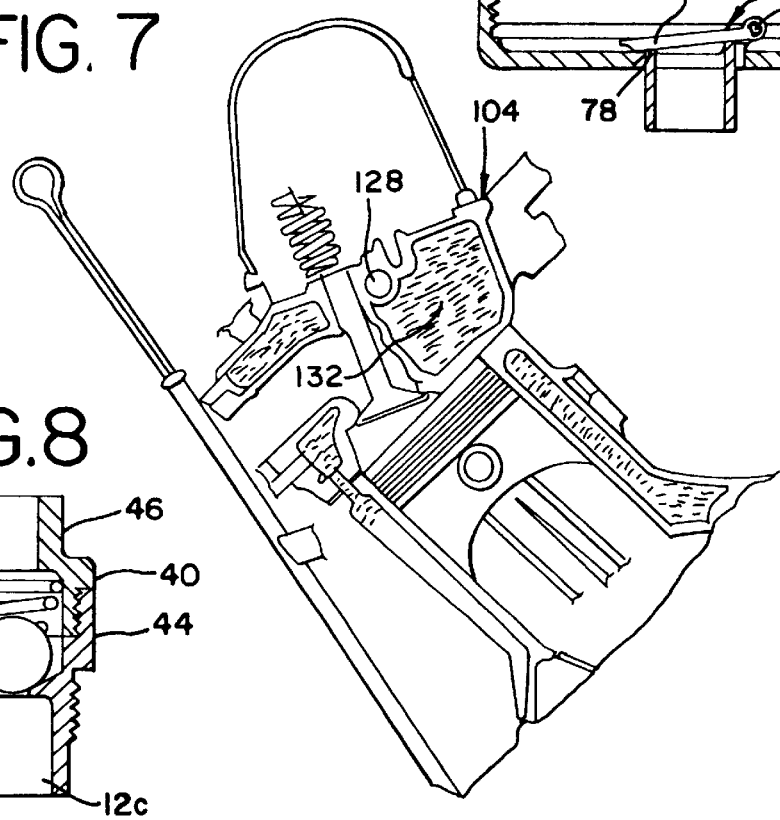
FIG. 7 is a sectional view of one section of an internal combustion engine showing the tube-like reactor chamber therein.
Figure 8:
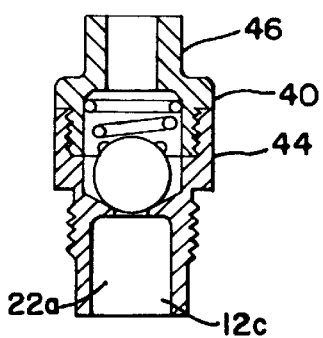
FIG. 8 is a sectional view of a discharge valve.

In an alternate embodiment, as seen in FIGS. 5, 6 and 7, an internal air conditioning system is formed integrally with engine 126. The engine 126 includes an engine block 104 having an internal reactor refrigerant chamber 128 in the form of a tube therein, for holding, treating and accommodating the circulation of refrigerant in and out of the engine block 104. The reactor refrigerant chamber is located adjacent the engine coolant chamber 132. The high temperature of the running engine raises the temperature of the refrigerant that is in the chamber 128 to where the refrigerant exits chamber 128 as a high temperature high pressure vapor and flows to the condenser 106 through outlet pipe 118. While in the condenser 106, the refrigerant vapor condenses to liquid and exits the condenser as low temperature liquid refrigerant. The refrigerant then enters into a dryer 110 which removes all possible water moisture and lows back through pipe 14 to the evaporator 100. The refrigerant exits the evaporator 100 as a low temperature low pressure vapor, and enters into an accumulator 102 from where the refrigerant enters chamber 128 through inlet pipe 114 as low temperature low pressure vapor, thus completing the cycle.

It will be apparent to one of ordinary skill that the reaction chamber formed integrally with the engine block 104 could also be integrally formed of any sufficiently sized structural component of an engine or motor, such as castings, forgings or fabrications used as housings for an electric motor. As the size of electric motors grows and their utilization in vehicles such as automobiles expands, this option will become increasingly viable. Further, where a motor gives off sufficient heat to require exterior cooling, a separate unit could be used in substantially the same manner as with an internal combustion engine.

What is claimed is:

1. An air conditioning system which utilizes the waste heat from the coolant system of an internal combustion engine, comprising:

an internal combustion engine having a coolant inlet and a coolant outlet;

a reactor having an inner chamber and an outer chamber, said inner chamber having an inner chamber inlet pipe and an inner chamber outlet pipe, said outer chamber having an outer chamber inlet pipe and an outer chamber outlet pipe, said inner chamber being positioned inside said outer chamber, said outer chamber inlet pipe being connected to said coolant outlet by an engine outlet duct said inner chamber being easily detachable from said outer chamber;

a radiator having a radiator inlet and a radiator outlet, said radiator inlet being connected to said outer chamber outlet pipe by a radiator hose;

a water pump having a pump inlet and a pump outlet, said pump inlet being connected to said radiator outlet by a pump hose, said pump outlet being connected to said coolant inlet by an engine inlet duct;

a condenser having a condenser inlet and a condenser outlet, said condenser inlet being connected to said inner chamber outlet pipe by a condenser hose; and an evaporator having an evaporator inlet and an evaporator outlet, said evaporator inlet being connected to said condenser outlet by an evaporator pipe, said evaporator outlet having an evaporator outlet pipe extending therefrom and connecting to said inner chamber inlet pipe.

2. An air conditioning system as in claim 1 wherein, a bypass line having a first end and a second end, said first end being connected to said inner chamber outlet pipe, said second end being connected to said evaporator outlet pipe; and a two-way flow control valve is connected to both said first and second ends of said bypass line.

3. An air conditioning system which utilizes the waste heat from the coolant system of an engine, comprising:

an engine having a coolant inlet and a coolant outlet;

a reactor having an inner chamber and an outer chamber, said inner chamber having an inner chamber inlet pipe and an inner chamber outlet pipe, said outer chamber having an outer chamber inlet pipe and an outer chamber outlet pipe, said inner chamber being positioned inside said outer chamber, said outer chamber inlet pipe being connected to said coolant outlet by an engine outlet duct, said inner chamber being easily detachable from said outer chamber;

a radiator having a radiator inlet and a radiator outlet, said radiator inlet being connected to said outer chamber outlet pipe by a radiator hose;

a coolant pump having a pump inlet and a pump outlet, said pump inlet being connected to said radiator outlet by a pump hose, said pump outlet being connected to said coolant inlet by an engine inlet duct;

a condenser having a condenser inlet and a condenser outlet, said condenser inlet being connected to said inner chamber outlet pipe by a condenser hose;

an evaporator having an evaporator inlet and an evaporator outlet, said evaporator inlet being connected to said condenser outlet by an evaporator pipe, said evaporator outlet having an evaporator outlet pipe extending therefrom and connecting to said inner chamber inlet pipe;

means for controlling and directing the flow of a refrigerant fluid from a low pressure area to the reactor and thence to the evaporator.

4. An air conditioner reactor for an air conditioning system used in conjunction with an engine, comprising:

an inner chamber having a first inner end, a second inner end, and an inner chamber wall, said first inner end having an outlet hole therein, said second inner end having an inlet hole therein; an outer chamber encompassing said inner chamber, said outside chamber having a first outer end, a second outer end, and an outer chamber wall, said first outer end having an outlet hole therein, said second outer end having an inlet hole therein, said outer chamber wall having a wall inlet hole and a wall outlet hole therein;

said inner chamber being easily detachable from said outer chamber;

a chamber outlet pipe extending through said outlet hole of the outer chamber and connecting to said outlet hole of the inner chamber;

a chamber inlet pipe extending through said inlet hole of the inner chamber and connecting to said inlet hole of the inner chamber;

a chamber wall outlet pipe connected to said wall outlet hole; and a chamber wall inlet pipe connected to said wall inlet hole.

5. An air conditioner reactor for an air conditioning system used in conjunction with an engine integral to said engine as in claim 4 wherein, an evaporator is operatively connected to said inner chamber;

a condenser is operatively connected to said evaporator; and a dryer is in fluid connection between said evaporator and said condenser.

6. An air conditioner reactor for an air conditioning system used in conjunction with an engine integral to said engine as in claim 5 wherein, a bypass pipe is mounted between and in connection with said means for delivering said fluid to said entrance opening and said means for receiving fluid from said condenser.

7. An air conditioner reactor for an air conditioning system used in conjunction with an engine integral to said engine as in claim 6 wherein a two-way flow control valve is connected to both said first and second ends of said bypass pipe.

8. An air conditioner reactor for an air conditioning system used in conjunction with an engine as in claim 4 wherein: said first inner end being screwably connectable to said inner chamber wall, said second inner end being screwably connectable to said inner chamber wall, said first outer end being screwably connectable to said outer chamber wall, said second outer end being screwably connectable to said outer chamber wall.

9. An air conditioner reactor for an air conditioning system used in conjunction with an engine as in claim 4 wherein: said chamber inlet pipe has threaded ends, said chamber outlet pipe has threaded ends, said chamber wall inlet pipe has threaded ends, said chamber wall outlet pipe has threaded ends, said outlet hole is threaded to screwably receive said chamber outlet pipe, said inlet hole is threaded to screwably receive said chamber inlet pipe, said wall inlet hole is threaded to screwably receive chamber wall inlet pipe, said wall outlet hole is threaded to screwably receive chamber wall outlet pipe.

10. An air conditioner reactor for an air conditioning system used in conjunction with an engine integral within said engine, comprising:

an engine;

a reactor refrigerant chamber mounted integral to said engine having a refrigerant entrance opening and a refrigerant exit opening;

a condenser having means for receiving fluid from said refrigerant exit opening;

an evaporator having means for receiving fluid from said condenser and means for delivering fluid to said entrance opening; and a bypass pipe is mounted between and in connection with said means for delivering said fluid to said entrance opening and said means for receiving fluid from said condenser.

* * * * *